United States Patent

Jamison et al.

[15] 3,675,199
[45] July 4, 1972

[54] VEHICLE POSITION MARKING DEVICE

[72] Inventors: Robert W. Jamison, Springfield Township, Delaware County, Pa.; Paul A. Norcross, Downers Grove, Ill.

[73] Assignee: Union Oil Company of California, Los Angeles, Calif.

[22] Filed: June 15, 1970

[21] Appl. No.: 46,181

[52] U.S. Cl. .................................. 340/62, 73/490, 324/163, 324/175, 42/84
[51] Int. Cl. ...................................... G01p 3/52, G01c 22/02
[58] Field of Search ............. 340/62; 73/128, 129, 488, 490; 74/3; 116/37; 317/5; 42/84; 324/163, 175, 166, 180

[56] References Cited

UNITED STATES PATENTS

| | | | |
|---|---|---|---|
| 3,125,884 | 3/1964 | Davies | 73/488 |
| 2,279,409 | 4/1942 | Milster et al. | 73/128 |
| 3,231,807 | 1/1966 | Willis | 324/175 |
| 3,332,406 | 7/1967 | Perry et al. | 317/5 |

*Primary Examiner*—Thomas B. Habecker
*Assistant Examiner*—Glen R. Swann, III
*Attorney*—Milton W. Lee, Richard C. Hartman, Lannas S. Henderson, Dean Sandford and Robert E. Strauss

[57] ABSTRACT

A wheeled device adapted for attachment to a vehicle for marking the location on a surface where the vehicle traveling over the surface attains a selected speed. The device includes a marking gun adapted to fire an electrically detonable cartridge containing a color marking substance and an electronic speedometer that electrically detonates the cartridge at the selected speed, thereby discharging the color marking substance downwardly against the surface to mark thereon the location where the vehicle attains the selected speed.

10 Claims, 10 Drawing Figures

Patented July 4, 1972

INVENTORS
ROBERT W. JAMISON
PAUL A. NORCROSS
BY
Dean Sundford
ATTORNEY

Patented July 4, 1972

INVENTORS
ROBERT W. JAMISON
PAUL A. NORCROSS
BY
Dean Sandford
ATTORNEY

Patented July 4, 1972

INVENTORS
ROBERT W. JAMISON
PAUL A. NORCROSS
BY
Dean Sandford
ATTORNEY

VEHICLE POSITION MARKING DEVICE

This invention relates to vehicle performance testing, and more particularly, to a device attachable to a vehicle for marking the location on a surface where the vehicle traveling over the surface attains a selected speed. The device has particular application in measuring vehicle stopping and acceleration distances.

It is often necessary to measure the distance traversed by a moving vehicle during a particular speed interval in order to obtain information concerning various performance capabilities of the vehicle. For example, in measuring the stopping or acceleration capability of a vehicle, the distance traversed by the vehicle during a stopping test, or alternatively, during an acceleration test, must be measured. This information is of great importance to competitive automobile manufacturers for design, promotion and advertising purposes, and is also valuable to certain state and federal agencies which perform highway safety functions.

While the mechanics of measuring distance may be relatively simple, it is sometimes very difficult to accurately establish the points between which the measurement is to be made. For example, in determining the vehicle stopping distance, the minimum longitudinal distance required to bring the vehicle traveling at a standard speed to a complete halt is measured. This minimum distance is the distance traversed by the vehicle during deceleration from a standard test speed to a complete halt, and does not include any distance traversed prior to deceleration to the standard test speed or after the vehicle is initially brought to a halt. Hence, the exact location of the vehicle at the commencement and termination of the test must be accurately determined. The location of the halted vehicle at the termination of the stopping phase is easily determined, and thus the only major difficulty in measuring the stopping distance is in accurately establishing the location of the vehicle at the commencement of the stopping phase, i.e., the location where the vehicle decelerates through the standard test speed. A similar problem is encountered in determining the distance required for a vehicle to accelerate from zero to a standard test speed or between two standard test speeds. In this test, the major difficulty is determining the location of the vehicle at the termination of the acceleration phase, i.e., the location where the vehicle accelerates through the standard speed, or, in the case where the acceleration test is started at other than a zero initial speed, in determining the locations where the vehicle passes through the initial and terminal standard test speeds. Accordingly, the exact location where the vehicle attains a standard test speed must be determined in both the stopping and acceleration tests.

Several devices for marking the location where a vehicle attains a preselected speed have heretofore been proposed. One such device employs a manually fired marking gun that propels a color marking substance onto the surface over which the vehicle is traveling so as to produce a readily visable spot on the surface. The gun is fired by a compression detonable cylinder actuated by a solenoid that can be energized from the drivers compartment. In a typical application, a vehicle is driven over a test tract at a speed greater than or equal to the standard or pre-selected speed. The driver applies the vehicle brakes and, as the vehicle decelerates through the standard speed, the marking gun is manually fired to mark the location where the standard speed is attained. When the vehicle finally comes to a halt, the distance between the marked spot on the test track and the halted vehicle is measured to obtain the stopping distance.

The accuracy of the measurements obtained by this technique is dependent upon several factors which can vary from test to test. For example, error can be introduced into the measured distance by inaccuracies in the speedometer, by a different response time in triggering the marking gun for comparable tests, by a triggering lag time in the marking gun, and by a detonation lag time in the firing of the marking cartridge. Often, particularly when different drivers are used in the tests, the measured stopping distances or acceleration distances are grossly inaccurate. For example, in measuring the stopping distance of a vehicle traveling at a standard test speed of 65 miles per hour, the above described procedure has resulted in errors as great as 100 percent of the true stopping distance. Accordingly, need exists for an improved device that accurately marks the location where a vehicle attains a selected speed, that does not require manual operation, that is relatively simple and economical to construct, and that is relatively compact and easy to operate.

Accordingly, a principal object of this invention is to provide a device for marking the location on a surface where a vehicle traveling over the surface attains a selected speed. Another object of the invention is to provide a device for marking the location where a decelerating vehicle attains a selected speed. Still another object of the invention is to provide a device for marking the location where an accelerating vehicle attains a selected speed. A further object of the invention is to provide an improved marking device for marking on a surface the location of a vehicle traveling over the surface. A still further object of the invention is to provide an improved electrically detonable marking cartridge.

Other and related objects will become apparent from the following description and attendant drawings, wherein like numerals refer to corresponding parts, and in which.

The foregoing objects and their attendant advantages can be realized with a wheeled device adapted for attachment to a vehicle, and which includes a marking gun adapted to fire an electrically detonable cartridge containing a color marking substance and an electronic speedometer that electrically detonates the cartridge at a selected speed, thereby discharging the color marking substance downwardly against the surface over which the vehicle is traveling to mark thereon the location where the vehicle attains the selected speed. The electronic speedometer is comprised of a wheel mounted on a frame and adapted for rolling contact with said surface, and means for electronically measuring the speed of rotation of said wheel, the speed of rotation of the wheel being proportional to the linear velocity of the vehicle.

Figure 1:
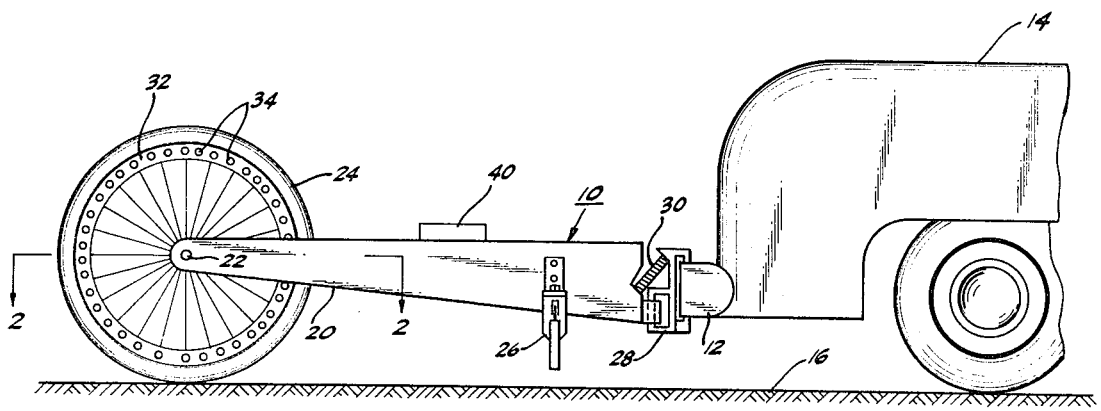
FIG. 1 is an elevation view showing the device of this invention attached to the rear of a test vehicle.
Figure 2:
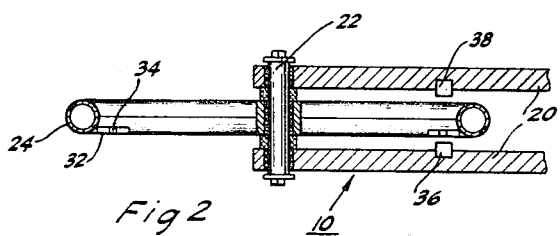
FIG. 2 is a partial longitudinal cross-sectional view of the device taken along the line 2—2 in FIG. 1.

Referring now to FIGS. 1 and 2 of the drawings, the numeral 10 generally represents the wheeled device of this invention adapted for connection to the rear bumper 12 of test vehicle 14 which is illustrated traveling over surface 16. Device 10 is comprised of frame 20 having axle 22 mounted transversely at one end thereof, wheel 24 being rotatably mounted on axle 22 and in rolling contact with surface 16, marking gun 26 in a downwardly directed vertical position on frame 20, and hitch 28 which permits the device to be readily connected and disconnected from vehicle 14. Hitch 28 is provided with spring 30 which maintains a downward force on the device so that wheel 24 is firmly maintained in contact with surface 16. Marking gun 26 is adapted to receive an electrically detonable cartridge containing a color marking substance which, when detonated, is discharged downwardly against surface 16 marking the location of the vehicle at that particular instant. Alternatively, marking gun 26 can be mounted directly on vehicle 14.

The speed of vehicle 14 is determined by electronically detecting the speed of rotation of wheel 24, which velocity is proportional to the linear velocity of the vehicle. The rotational speed of wheel 24 is detected by generating a series of electrical pulses having a frequency proportional to the rotational velocity of the wheel, and converting these pulsed signals to an analog electrical signal having a voltage proportional to the rotational speed of wheel 24. The pulsed signals are generated by passing a light beam through a series of light pervious areas that rotate with wheel 24, the incident light activating a photoelectric cell that produces a pulsed signal having a frequency proportional to the speed of rotation of the wheel.

In one embodiment of the invention, opaque disc 32 is attached to wheel 24 so that it revolves with the wheel. Disc 32 is provided with a plurality of light pervious areas 34 of substantially uniform size and shape evenly disposed about its periphery and substantially equidistant from the axis of wheel 24. Light pervious areas 34 can be formed by drilling small apertures through an opaque metallic or plastic disc; however, it is preferred that the precisely spaced and minute light pervious areas be obtained by photographic techniques. These techniques are well known in the art and briefly comprise treating the disc with a photographic coating, exposing various areas of the disc to light, and chemically treating the coating to produce a plurality of light pervious areas evenly spaced on the otherwise opaque material.

As particularly illustrated in FIG. 2, a light source 36 is mounted on frame 20 adjacent to disc 32 so that light from the light source passes through the light pervious areas 34 and impinges on photoelectric cell 38 mounted on frame 20 on the opposite side of disc 32 from the light source. Light source 36 and photoelectric cell 38 are connected to a suitable power source and to the electronic speedometer circuitry, which is in part contained within the control box 40 mounted on frame 20, by means of suitable electrical conductors, not shown. As the vehicle travels over the surface, wheel 24 rotates about axle 22 causing the light pervious areas 34 in disc 32 to successively pass between light source 36 and photoelectric cell 38. Thus, light from light source 36 intermittently strikes photoelectric cell 38 causing the photoelectric cell to generate a series of electrical impulses. Accordingly, as wheel 24 rolls along the surface, a series of electrical impulses are produced by the photoelectric cell, the frequency of the pulses being proportional to the speed of rotation of wheel 24, which is in turn proportional to the linear velocity to vehicle 14.

Figure 3:
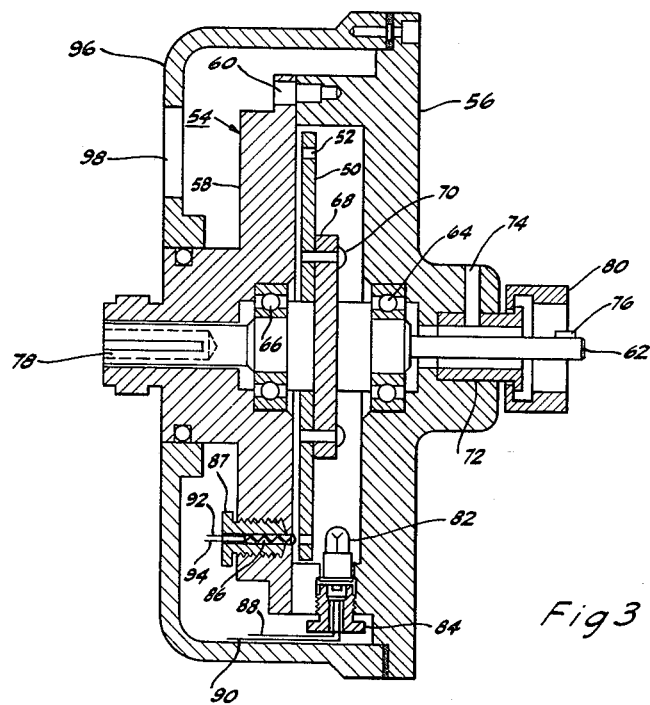
FIG. 3 is a cross-sectional view of another embodiment of pulse generator.
Figure 4:
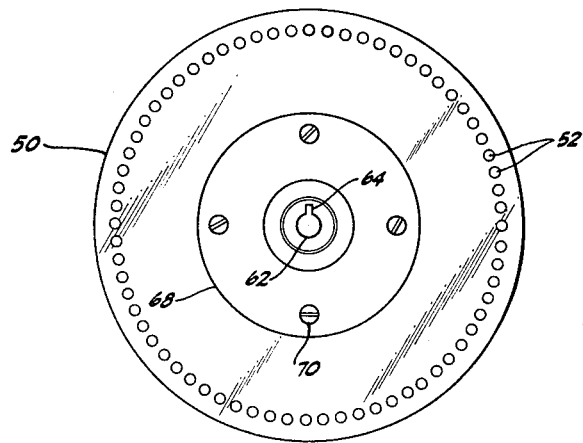
FIG. 4 is an elevation view of the perforated disc employed in the pulse generator illustrated in FIG. 3.

In another and preferred embodiment of the invention, the pulse generating device is a separate unit mounted on axle 22 so as to project outwardly at one side of wheel 24. This embodiment of pulse generating device is particularly illustrated in FIGS. 3 and 4, wherein opaque disc 50 having a plurality of perforations 52 of uniform size and shape evenly disposed about its periphery is depicted rotatably mounted in housing 54, which is comprised of a support plate 56 and a mating cover plate 58 secured thereto by bolts 60. Both support plate 56 and cover plate 58 are apertured to accommodate shaft 62, which is rotatably supported within housing 54 by bearings 64 and 66. Disc 50 is attached to radially extending flange 68 of shaft 62 by bolts 70. Flanged bushing 72 is mounted in the aperture in support plate 56 and secured therewithin by means of pin 74. Shaft 62 is provided with key 76 adjacent to its inboard end which is adapted to engage a keyway in axle 22, not shown. The outboard end of shaft 62 can be provided with a similar keyway 78 for attaching another device, such as tachometer, or the like. The pulse generating device is mounted on axle 22 by nut 80, which threadably engages the axle. Shaft 62 is axially aligned with and keyed to axle 22 so that disc 50 is rotably driven at the same angular velocity as wheel 24.

Light source 82 is mounted in housing 54 by means of threaded bushing 84, and is positioned adjacent to disc 50 so that light from the light source passes through perforations 52 and impinges on photoelectric cell 86. The photoelectric cell is mounted within housing 54 by means of threaded bushing 87, so that the photoelectric cell is adjacent to perforations 52 and on the opposite side of disc 50 from the light source. Light source 82 and photoelectric cell 86 are respectively connected to the electrical circuitry by means of conductors 88, 90, 92 and 94. The electrical components are protected from dust and moisture by a sealed cover 96. Exterior of the pulse generator, the conductors can be enclosed within a flexible conduit, not shown, connected to aperture 98 in cover 96. This embodiment of the pulse generating unit operates similarly to the wheel mounted unit, with light from the light source passing through the perforations in disc 50 and activating the photocell to produce a series of electrical pulses having a frequency proportional to the angular velocity of wheel 24, which in turn is proportional to the linear velocity of vehicle 14.

Figure 5:
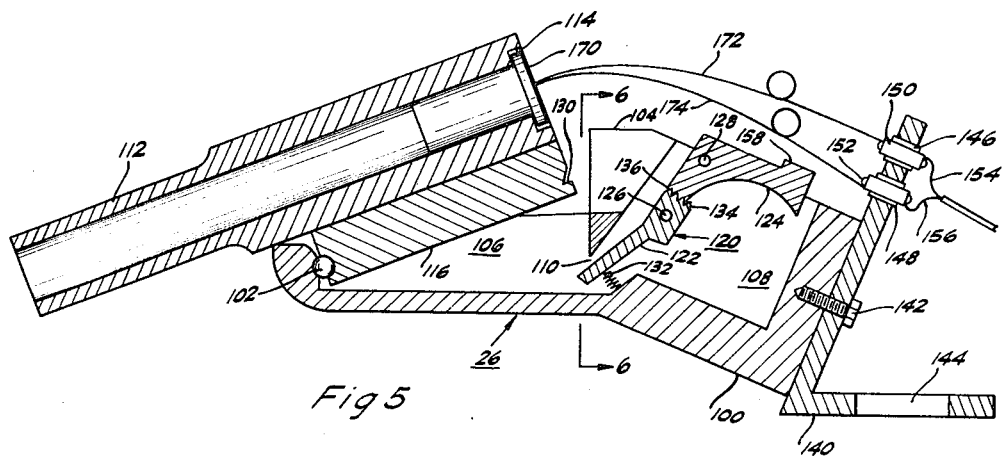
FIG. 5 is a longitudinal cross-sectional view illustrating the marking gun of this invention.
Figure 6:
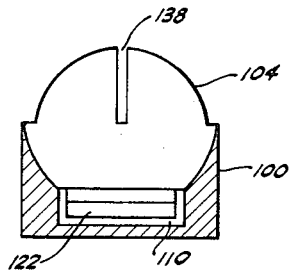
FIG. 6 is a cross-sectional view of the marking gun taken along the line 6—6 in FIG. 5.

One embodiment of marking gun 26 useful in the practice of this invention is shown in FIGS. 5 and 6. The illustrated device includes a frame 100 having an integrally formed pivot pin 102 at its forward end and an integral breech block 104 at an intermediate location, the frame defining a hollow forward cavity 106 and a hollow butt cavity 108 interconnected through aperture 110 located immediately below breech block 104. A short barrel 112 having an integral chamber 114 adapted to receive an electrically detonable cartridge 170 and an integrally formed rectangular base 116 is pivotly mounted on pivot pin 102. Forward cavity 106 is adapted to receive base 116 and the chamber end of barrel 112, chamber 114 being closed by abutment with breech block 104. Barrel 112, by virtue of its pivotal attachment to frame 100, can be moved from the open position illustrated in FIG. 5, providing access to chamber 114, to a closed firing position in which the chamber end of barrel 112 abuts the breech block.

Barrel 112 is maintained in a closed position by means of releasable locking mechanism 120 mounted in butt cavity 108 of frame 100. The locking mechanism is comprised of locking arm 122 and release arm 124 pivotally mounted on the interior of frame 100 by means of pins 126 and 128, respectively. Arm 122 is mounted so that one end projects through aperture 110 and engages notch 130 at the rear of base 116. Locking arm 122 is held in engagement with notch 130 by spring 132 which biases the locking arm against base 116. The other end of locking arm 122 is provided with gear teeth 134 which mate with similar gear teeth 136 on one end of release arm 124. The other end of arm 124 projects outwardly from the frame and terminates in a tab or button 158 which may be operated to release the locking mechanism, allowing the barrel to be moved to an open position. A downward force applied to release button 158 causes release arm 124 to pivot clockwise about pin 128, which in turn overcomes the biasing force of spring 132 and causes locking arm 122 to be moved in the opposite direction, thereby withdrawing arm 122 from engagement with notch 130. Upon release of the force applied to release button 158, the biasing force returns the arms 122 and 124 to their original positions.

An L-shaped mounting bracket 140 is bolted to the butt of frame 100 by bolt 142 to provide means for attaching marking gun 26 to frame 20 of the wheeled device. Bracket 140 is provided with an elongated slot 144 through which the marking gun is adjustably bolted to frame 20 so that the marking gun is supported in a substantially vertical, downwardly directed position when wheeled device 10 is attached to the vehicle 14, with the muzzle end of the gun being maintained a short distance above surface 16. Bracket 140 is apertured at 146 and 148 and two-pole electrical terminals 150 and 152 inserted through these apertures, respectively, and electrically insulated from the bracket. The electrical firing mechanism, which will hereinafter be more fully described, is electrically connected through conductors 154 and 156 to one pole of each of the terminals 150 and 152, respectively, and electrically detonable cartridge 170 is electrically connected to the other poles of terminals 150 and 152 through conductors 172 and 174, respectively. The gun is loaded by inserting cartridge 170 into chamber 114, moving the barrel to the closed position, and connecting conductors 172 and 174 to the terminals. Breech block 104 is provided with longitudinal slot 138 to accommodate conductors 170 and 172 when barrel 112 is in closed position.

Marking gun 26 can be conveniently constructed from a conventional shot gun, such as a single-shot breech loading shot gun in 8, 10, 12, 16 or .410 gauge. Also, it should be recognized that two or more of the marking guns can be mounted on wheeled device 10 to provide marks on surface 16 responsive to different signals, or that a double barrel gun can be employed to provide this feature.

Figure 7:
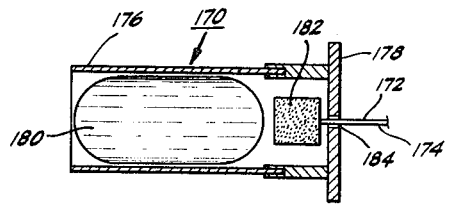
FIG. 7 is a longitudinal cross-sectional view illustrating the marking cartridge of this invention.

As illustrated in FIG. 7, electrically detonable cartridge 170 is comprised of tubular casing 176 attached to flanged base 178. The cartridge is loaded with capsule 180 of a color marking substance, such as thick paint, and an electrically detonable primer 182 electrically connected to conductors 172 and 174, which pass through aperture 184 in base 178. To minimize time lag in the firing system, it is preferred that primer 182 have a detonation time below about 30 milliseconds, and more preferably below about 15 milliseconds. On detonation, primer 182 propels the capsule of color marking substance from cartridge 170. The color marking substance passes through barrel 112 and strikes surface 16, leaving thereon a clear mark of colored substance showing the location of the device on the surface at the time of detonation. Cartridge 170 can be readily constructed from a conventional shot gun shell of a size adapted to fit chamber 114 by removing the wadding, shot and primer, and inserting therein an electrically detonable primer 182 and capsule 180. Also, it is apparent that cartridge 170 can be conveniently constructed from an empty shell or from the component parts thereof.

Figure 8:
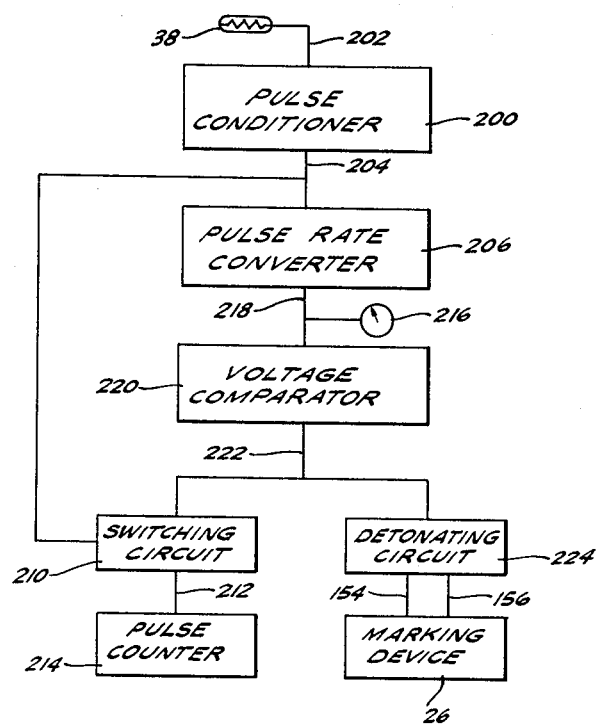
FIG. 8 is a block diagram illustrating the electrical circuitry employed in this invention.

The schematic arrangement of the electronic speed measuring and detonating circuits is illustrated in FIG. 8. Photoelectric cell 38 is electrically connected to pulse conditioner 200 by conductor 202. Pulse conditioner 200 receives the electrical impulses from the photoelectric cell and produces modulated impulses having uniform amplitude and wave form. The number and frequency of the modulated impulses is equal to the number and frequency of impulses produced by the photoelectric cell, however, it is recognized that in other embodiments of this mechanism the number and/or frequency of the modulated impulses can be proportionally higher or lower than the input impulses. While many conventional conditioner circuits can be employed in the practice of this invention, a preferred circuit comprises a solid state one-shot multivibrator, an electronic filter and an amplifier in series connection.

The output of pulse conditioner 200 is electrically connected by conductor 204 to pulse rate converter 206 and, through switching circuit 210 and conductor 212, to pulse counter 214. Pulse rate converter 206 is a digital-analog device that converts the modulated impulses from the pulse rate conditioner to an analog electrical signal proportional to the frequency of the modulated pulses. While the analog electrical signal can be varied in different ways to represent the frequency of the pulsed signal, i.e., by varying the current, the frequency, or the phase, it is preferred that the analog output from pulse rate converter 206 be a relatively stable DC potential having a voltage directly proportional to the rate at which the modulated impulses are received, i.e., the number of impulses received per unit of time. By relatively stable it is meant that the output signal is substantially non-oscillating for a fixed impulse rate. While it is desired that the analog output of the pulse rate converter be completely stable, it is recognized that minor voltage oscillations can occur, and it is preferred that the converter circuit be selected so that the amplitude of each of the oscillations is below about 1 percent of the total output potential. Conventional digital-analog converter circuits are well known in the art, hence a description thereof is not presented herein.

The output of pulse rate converter 206 is electrically connected by means of conductor 218 to voltmeter 216 and voltage comparator 220. The analog DC output potential from the pulse rate converter is continuously monitored by means of the voltmeter. Since the analog output from pulse rate converter 206 is proportional to the vehicle speed, voltmeter 216 can be calibrated directly in units of vehicle speed. Thus, voltmeter 216 can be employed as an electronic speedometer which can be used to accurately determine the instantaneous speed of the vehicle at any instant of time. Voltage comparator 220 compares the magnitude of the analog DC potential output from the pulse rate converter with a reference DC potential corresponding to a reference vehicle speed, and produces an electrical output signal when the analog signal is equal to or less than the reference potential. Since the analog potential is representative of vehicle speed, the comparator produces an electrical signal whenever the vehicle is traveling at a speed equal to or less than the reference speed.

The output of voltage comparator 220 is electrically connected by means of conductor 222 to switching circuit 210 and detonating circuit 224. Switching circuit 210 comprises two electrically activated switches connected in series. While coil operated relays can be employed, it is preferred that solid state switches such as silicon controlled rectifiers be used. One of the switches is activated into the conductive state by the output signal from voltage comparator 220 when the vehicle attains a preselected or reference speed. The second switch is used in measuring vehicle stopping distance, and is activated into the conductive state whenever the vehicle decelerates. This switch can be conveniently connected to the vehicle brake light circuit so that it is activated whenever the vehicle brakes are applied. Thus, when the vehicle is traveling at a speed greater than the reference speed with the brakes off, both switches are in the non-conductive state and pulse counter 214 is disconnected from the modulated output of pulse conditioner 200. However, when the brakes are applied, the second switch is electrically activated into the conductive state and, as the vehicle decelerates to the reference speed, the first switch is electrically activated into the conductive state connecting the output of the pulse conditioner to pulse counter 214. Hence, in this embodiment of the circuitry useful in measuring vehicle stopping distance, the pulse output from pulse conditioner 200 is counted or totalized on pulse counter 214 during the period that the vehicle brakes are applied and the vehicle speed is equal to or less than the reference speed. The total number of pulses during this period is an indication of the distance traveled during the stopping test. Various conventional totalizers or pulse counters are commercially available, and hence a detailed description of an exemplary totalizer circuit is unnecessary. While pulse counter 214 can employ any means of recording and/or indicating the accumulated number of pulses, it is preferred that the accumulated number of pulses be indicated on nixi-tubes for visual observation by the vehicle driver.

Detonating circuit 224 is electrically connected to marking device 26 by conductors 154 and 156. This circuit, responsive to the output signal from voltage comparator 220, generates the firing signal that detonates the electrically detonable primer in cartridge 170 causing the color marking substance to be discharged.

Figure 9:
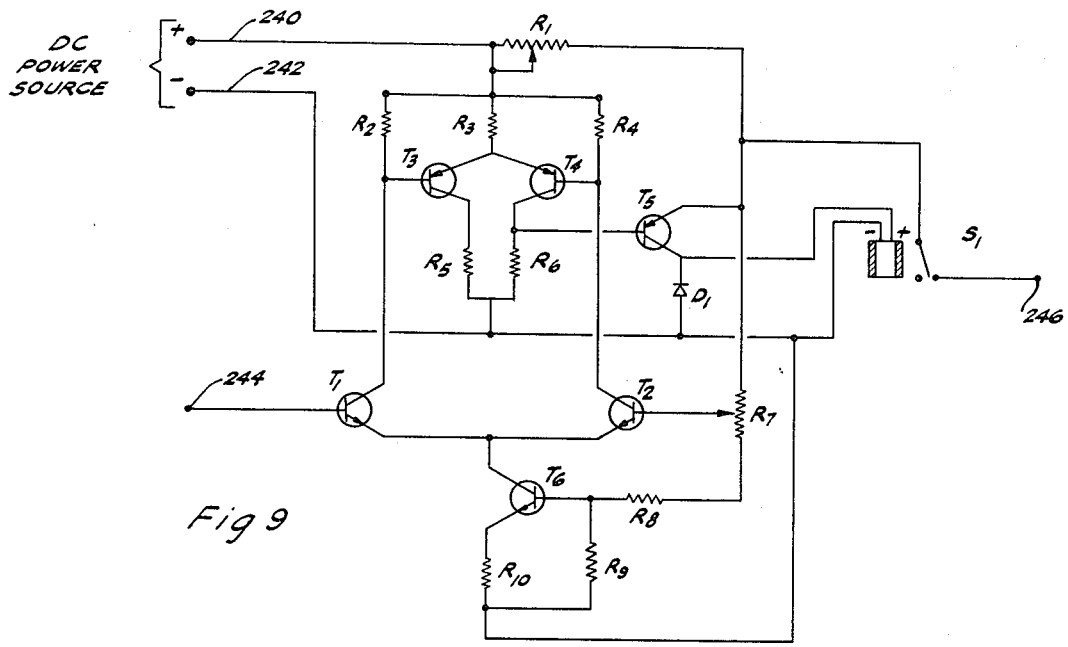
FIG. 9 is a schematic electrical diagram illustrating the electrical circuitry of the voltage comparator of this invention.

While several embodiments of voltage comparator circuits can be employed, one preferred embodiment utilizing solid state circuitry is illustrated schematically in FIG. 9. The illustrated circuit comprises two differential amplifiers coupled together with a constant current generator. The collectors of NPN transistors $T_1$ and $T_2$ in the first differential amplifier are respectively connected to the bases of PNP transistors $T_3$ and $T_4$ in the second differential amplifier. The emitters of transistors $T_1$ and $T_2$ are commonly connected to the collector of NPN transistor $T_6$ in the constant current generator. A DC power supply is connected across positive terminal 240 and negative terminal 242. Positive terminal 240 is connected through resistor $R_2$ to the base of transistor $T_3$ and the collector of transistor $T_1$; through resistor $R_4$ to the base of transistor $T_4$ and the collector of transistor $T_2$; through resistor $R_3$ to the emitters of transistors $T_3$ and $T_4$; through variable resistor $R_1$ to the emitter of PNP transistor $T_5$ and to a normally closed contact in relay $S_1$; through resistor $R_1$ and potentiometer $R_7$ to the base of transistor $T_2$; and through resistor $R_1$, potentiometer $R_7$ and resistor $R_8$ to the base of transistor $T_6$. Negative terminal 242 is connected through resistor $R_5$ to the collector of transistor $T_3$; through resistor $R_6$ to the collector of transistor $T_4$ and the base of transistor $T_5$; through diode $D_1$ to the collector of transistor $T_5$ and to the positive terminal of the coil in relay $S_1$; to the negative terminal of the coil in relay $S_1$; through resistor $R_9$ to the base of transistor $T_6$; and through resistor $R_{10}$ to the emitter of transistor $T_6$. The analog DC potential from pulse rate converter 206 is connected to the base of transistor $T_1$ through terminal 244, and output conductor 222 is connected to terminal 246.

In operation, a DC potential is applied across terminals 240 and 242 of the comparator circuit. The current flowing into the amplifier circuit is divided between the first and second differential amplifiers, with the total current through the first differential amplifier being controlled by the constant current generator. Potentiometer $R_7$ is adjusted so that a reference DC potential corresponding to a reference vehicle speed is impressed across the base of transistor $T_2$. The analog DC potential from pulse rate converter 206 is applied to the base of transistor $T_1$. When the analog DC potential is greater than the reference potential, transistor $T_1$ conducts more current than transistor $T_2$ and causes the collector of transistor $T_4$ to become more negative than the collector of transistor $T_3$. Hence transistor $T_5$ conducts sufficient current to energize relay switch $S_1$ which interrupts the output signal. Conversely, when the analog DC potential is less than the reference potential, the opposite effect occurs, i.e., transistor $T_5$ does not conduct sufficient current to maintain relay switch $S_1$ energized, thus allowing current to flow through output terminal 246.

Figure 10:
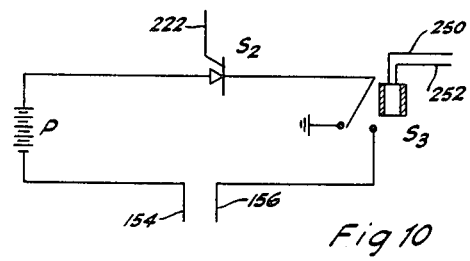
FIG. 10 is a schematic electrical diagram illustrating the detonating circuit of this invention.

FIG. 10 illustrates one embodiment of a detonating circuit that can be employed in the practice of this invention. As shown in the diagram, DC power source P, silicon controlled rectifier $S_2$ and relay $S_3$ are all series connected in closed circuit with marking device 26, with the marking device being connected through conductors 154 and 156. The gate of silicon controlled rectifier $S_2$ is connected to conductor 222 and the coil of relay $S_3$ is electrically connected through conductors 250 and 252 to the braking system of the test vehicle, e.g., connected to the brake light switch, so that relay $S_3$ is energized whenever the brakes are applied. Hence, a firing potential is applied across the marking device 10 whenever rectifier $S_2$ is activated into the conductive state by the output from voltage comparator 220 and relay $S_3$ is energized by the application of the vehicle brakes, the firing potential causing the detonation of the electrically detonable primer in cartridge 170. When the device is employed to measure acceleration distance, relay $S_3$ is deleted from the circuit or bypassed and switch $S_1$ in the comparator circuit is replaced with a normally open relay switch. In cases where the output from voltage comparator 220 is sufficient to quickly detonate the electrically detonable primer in marking device 26, the detonating circuit can be replaced by a switching circuit similar to switching circuit 210.

The electronic speed measuring and firing circuitry must be calibrated before tests are conducted so as to insure accurate performance of the equipment. The calibration of the circuits of this invention can be accomplished in several ways, however, the following procedure is preferred. A three track oscilloscope is connected to the output terminals of the pulse conditioner, pulse rate converter and voltage comparator. The circuits are turned on and allowed to warm up for approximately 1 hour. The wheel is rotated so that the photoelectric cell produces a continuous source of electrical impulses, and the pulse conditioner adjusted so that the modulated impulses generated by the circuit are of desired amplitude and shape. The wheel is then spun at various speeds of revolution corresponding to known vehicle speeds, and the pulse rate converter is adjusted so that the analog potential produced by the circuit has a direct linear relationship with the wheel speed. The voltage comparator is calibrated by adjusting resistors $R_1$ and $R_7$ so that when measuring the stopping distances, an output signal is detected on the oscilloscope when the wheel is spinning at a speed equal to or less than the reference speed, and when measuring the acceleration distances an output signal is detected when the wheel is spinning at a speed equal to or greater than the reference speed. Finally, the switching and detonating circuits are checked by connecting the output terminals in these circuits to the oscilloscope and rotating the wheel at a speed greater than the standard speed. The wheel is then decelerated through the reference speed and the oscillograph observed to determine whether or not a signal is produced in each circuit precisely at the moment the wheel decelerates through the reference speed. If no electrical signal is detected, or if a lag in the signal is detected, the resistors $R_1$ and $R_7$ in the comparator circuit are readjusted. This procedure is repeated until the desired results are obtained. In addition to the initial calibration, it is recommended that the circuits be recalibrated periodically to compensate for any potential drifting which may occur in the various circuits during operation.

The test apparatus of this invention can be used to measure the stopping and acceleration distances of a vehicle. In measuring the stopping distance, the wheel assembly and electrical circuitry are calibrated and attached to the test vehicle. The vehicle is driven over a test track at a speed equal to or greater than the reference speed, and the brakes are applied. As the vehicle decelerates through the reference speed, the comparator circuit generates an electrical signal which detonates the marking gun and closes the circuit between the pulse conditioner and pulse counter. With this dual switch hookup, the marking substance is propelled downwardly against the track surface and the pulse counter begins to receive modulated impulses from the pulse conditioner at or near the precise moment the vehicle decelerates through the reference speed, regardless of the speed of the vehicle at the time that the brakes were applied. The stopping distance is the distance from the marked surface to the stopped vehicle and can be readily measured with a measuring tape or like device. The stopping distance is also determined by multiplying the total number of pulses counted by the pulse counter by the distance traversed by the wheel in generating one complete electrical impulse.

In the embodiment of the device for measuring the acceleration distance, the second switch in switching circuit 210 and relay $S_3$ in the detonation circuit are deleted or bypassed, switch $S_1$ in the voltage comparator circuit is replaced by a normally open relay switch, and the first switch in switching circuit 210 is replaced by a switch which is normally conductive and is activated into the non-conductive state by electrical exitation. The initial position of the vehicle is marked and the vehicle is driven over the test track at maximum acceleration. As the vehicle accelerates through the reference speed, the comparator circuit generates an electrical signal which in turn detonates the marking gun and opens the circuit between the pulse conditioner and pulse counter. The marking gun propels the marking substance downwardly against the track surface and the pulse counter stops counting the modulated impulses at or near the precise moment the vehicle accelerates through the standard speed. The minimum acceleration distance is the distance from the vehicle position at the start of the acceleration test to the marked point on the track surface. The acceleration distance can also be determined by multiplying the total number of pulses counted by the pulse counter by the distance traversed by the wheel in generating one complete electrical impulse.

It is apparent to those skilled in the art that several modifications can be made to the apparatus and method of this invention and such are considered within the scope of this invention. It is also apparent that, with the disclosed apparatus, the minimum stopping distance can be simply and accurately measured. The effect of subtle changes in the braking system of the vehicle can be detected. The distance required for a vehicle to accelerate from zero or a given speed to a standard speed can be accurately measured. Also the instantaneous position of a moving vehicle can be marked. Hence, this invention represents a substantial advancement over the prior art devices for marking the location where a vehicle attains a preselected speed.

The invention having thus been described, we claim:

1. A device for marking on a surface the location where a vehicle traveling over the surface attains a selected speed, which comprises:
    speedometer means adapted for attachment to said vehicle for generating an electrical signal proportional to the speed of said vehicle;
    a gun adapted to fire an electrically detonable cartridge containing a color marking substance, said gun being adapted for mounting in a vertical, downwardly directed position above said surface; and
    means electrically connected to said cartridge for detonating said cartridge when the generated electrical signal attains a value corresponding to the selected speed;
    whereby, upon detonation of the cartridge, the color marking substance is propelled downwardly against said surface to mark thereon the location that the vehicle attains the selected speed.

2. The device defined in claim 1 wherein the electrical signal generated by said speedometer means is a relatively non-oscillating DC potential having a voltage proportional to the speed of the vehicle.

3. A device for marking on a surface the location where a vehicle traveling over the surface attains a selected speed, which comprises:
    a frame adapted for detachable connection to said vehicle;
    a wheel rotatably mounted on said frame and adapted for rolling contact with said surface;
    speedometer means for generating an electrical signal proportional to the speed of revolution of said wheel;
    a gun adapted to fire an electrically detonable cartridge containing a color marking substance, said gun being mounted in a vertical, downwardly directed position on said frame; and
    means electrically connected to said cartridge for detonating said cartridge when the generated electrical signal attains a value corresponding to the selected speed.

4. A device for marking on a surface the location where a vehicle traveling over the surface attains a selected speed, which comprises:
    speedometer means adapted for attachment to said vehicle for generating a series of electrical pulses having a frequency proportional to the speed of said vehicle;
    conditioner means electrically connected to said speedometer means for modulating said electrical pulses so as to produce a series of modulated electrical pulses;
    pulse rate converter means electrically connected to said conditioner means for generating an analog DC potential having a voltage proportional to the frequency of said modulated electrical pulses;
    comparator means electrically connected to said pulse rate converter for generating an electrical output signal when said DC potential is equal to or less than a reference DC potential corresponding to said selected vehicle speed;
    a gun adapted to fire an electrically detonable cartridge of color marking substance responsive to the electrical output signal from said comparator means; and
    means for mounting said gun in a vertical, downwardly directed position so that said color marking substance is propelled downwardly against said surface when said cartridge is detonated.

5. The device defined in claim 4 including means electrically connected to said pulse rate converter for indicating and/or recording said analog DC potential.

6. The device defined in claim 4 including means electrically connected to said conditioner means and to said comparator means for totalizing the number of modulated electrical pulses occurring during the period that said comparator means is generating said electrical output signal.

7. A device for marking on a surface the location where a vehicle traveling over the surface attains a selected speed, which comprises:
    a wheel assembly adapted for attachment to said vehicle, said assembly comprising a frame, an axle connected to said frame, a wheel rotatably mounted on said axle and adapted for rolling contact with said surface, and an opaque disc mounted so as to rotate with said wheel, said disc having a plurality of light pervious areas of uniform size and shape evenly disposed around its periphery and substantially equidistant from the axis of said wheel;
    a light source mounted at one side of said disc adjacent to said light pervious area;
    a photoelectric cell mounted on the opposite side of said disc from said light source and aligned so that light from said light source passes through said light pervious area and impinges on said photoelectric cell thereby causing said photoelectric cell to generate an electrical impulse;
    conditioner means electrically connected to said photoelectric cell for receiving said electrical impulses and generating a modulated electrical impulse for each electrical impulse received from said photoelectric cell;
    pulse rate converter means electrically connected to said conditioner means for receiving said modulated impulses and generating an analog D.C. potential having a voltage proportional to the rate at which said modulated impulses are received;
    comparator means electrically connected to said pulse rate converter for receiving said analog DC potential and producing an electrical output signal when said analog DC potential is equal to or less than a reference DC potential corresponding to said selected vehicle speed;
    a gun adapted for attachment to said frame for firing an electrically detonable cartridge containing a color marking substance downwardly against said surface; and
    detonating means electrically connected to said comparator means and to said cartridge for producing an electrical detonating signal responsive to said electrical output signal.

8. The device defined in claim 7 wherein said detonating means includes a first switching means that is rendered conductive by said electrical output signal.

9. The device defined in claim 8 wherein said vehicle is equipped with brakes and wherein said detonating means includes a second switching means that is closed when said brakes are applied.

10. A device for measuring the distance traversed by a vehicle traveling over a surface, which comprises:
    a wheel assembly adapted for attachment to said vehicle, said assembly comprising a frame, an axle connected to said frame, a wheel rotatably mounted in said axle and adapted for rolling contact with said surface, and an opaque disc mounted so as to rotate with said wheel, said disc having a plurality of light pervious areas of uniform size and shape evenly disposed around its periphery and substantially equidistant from the axis of said wheel;
    a light source mounted on said frame at one side of said disc adjacent to said light pervious area;
    a photoelectric cell mounted on said frame on the opposite side of said disc from said light source and aligned so that light from said light source passes through said light pervious areas and impinges on said photoelectric cell thereby causing said photoelectric cell to generate an electrical impulse;
    conditioner means electrically connected to said photoelectric cell for receiving said electrical impulses and generating a modulated electrical impulse for each electrical impulse received from said photoelectrical cell;

pulse rate converter means electrically connected to said conditioner means for receiving said modulated impulses and generating an analog DC potential having a voltage proportional to the rate at which said modulated impulses are received;

comparator means electrically connected to said pulse rate converter for receiving said analog DC potential and producing an electrical output signal when said analog DC potential is equal to or less than a reference DC potential corresponding to said selected vehicle speed;

a pulse counter electrically connected to said conditioner means through a first switching means responsive to said electrical output signal.

* * * * *